(12) United States Patent
Thiel

(10) Patent No.: US 12,367,267 B2
(45) Date of Patent: Jul. 22, 2025

(54) AUTHENTICATION OF VIDEO COMMUNICATIONS IN A VIRTUAL ENVIRONMENT

(71) Applicant: Zoom Communications, Inc., San Jose, CA (US)

(72) Inventor: Jordan Thiel, Leander, TX (US)

(73) Assignee: Zoom Communications, Inc., San Jose, CA (US)

( * ) Notice: Subject to any disclaimer, the term of this patent is extended or adjusted under 35 U.S.C. 154(b) by 324 days.

(21) Appl. No.: 17/515,497

(22) Filed: Oct. 31, 2021

(65) Prior Publication Data
US 2023/0139813 A1    May 4, 2023

(51) Int. Cl.
    G06F 21/31    (2013.01)
    H04L 12/18    (2006.01)
    H04N 7/15     (2006.01)

(52) U.S. Cl.
    CPC .......... G06F 21/31 (2013.01); H04L 12/1822 (2013.01); H04N 7/157 (2013.01)

(58) Field of Classification Search
    CPC .......... G06F 21/31; G06F 21/32; G06F 21/33; H04L 12/1822; H04L 12/1818; H04N 7/157
    See application file for complete search history.

(56) References Cited

U.S. PATENT DOCUMENTS

| | | | | |
|---|---|---|---|---|
| 2005/0152294 A1* | 7/2005 | Yu | ..................... | H04M 1/72412 370/310 |
| 2014/0359709 A1* | 12/2014 | Nassar | ................. | H04L 65/403 726/4 |
| 2016/0014119 A1* | 1/2016 | Inoue | .................. | H04L 63/0853 726/9 |
| 2016/0105472 A1* | 4/2016 | Chitroda | ............ | H04L 65/1094 709/204 |
| 2019/0132552 A1* | 5/2019 | Yoon | ....................... | G06F 21/10 |
| 2019/0356703 A1* | 11/2019 | Rosenberg | ........... | H04L 65/403 |
| 2019/0362312 A1* | 11/2019 | Platt | ..................... | H04L 65/1069 |
| 2020/0228524 A1* | 7/2020 | Szafranski | ............. | A63F 13/79 |
| 2022/0066621 A1* | 3/2022 | Appelbaum | ........ | G06F 3/04815 |
| 2022/0124283 A1* | 4/2022 | Krol | ........................ | H04N 21/44 |
| 2023/0065719 A1* | 3/2023 | Bryant | .................... | G01S 17/42 |
| 2023/0086248 A1* | 3/2023 | Puyol | ..................... | G06F 9/451 715/848 |

OTHER PUBLICATIONS

H. Regenbrecht et al., "An augmented virtuality approach to 3D videoconferencing," The Second IEEE and ACM International Symposium on Mixed and Augmented Reality, 2003. Proceedings., Tokyo, Japan, 2003, pp. 290-291, doi: 10.1109/ISMAR.2003. 1240725. (Year: 2003).*

* cited by examiner

Primary Examiner — Robert B Leung
(74) Attorney, Agent, or Firm — Young Basile Hanlon & MacFarlane, P.C.

(57) ABSTRACT

Methods, systems, and apparatus, including computer programs encoded on computer storage media relate to a method for authentication of video communications in a virtual environment. The system may provide a video conference session in a virtual environment. A VR or AR device may connect to a computer system to obtain credentials to access the video conference session. The VR or AR device may use the credentials to access and authenticate itself to the video conference session in the virtual environment.

21 Claims, 12 Drawing Sheets

AUTHENTICATION OF VIDEO COMMUNICATIONS IN A VIRTUAL ENVIRONMENT

FIELD

The present invention relates generally to video communications, and more particularly, to systems and methods for authenticating access to a video communications platform from a virtual environment.

SUMMARY

The appended claims may serve as a summary of this application.

DETAILED DESCRIPTION OF THE DRAWINGS

Figure 1A:
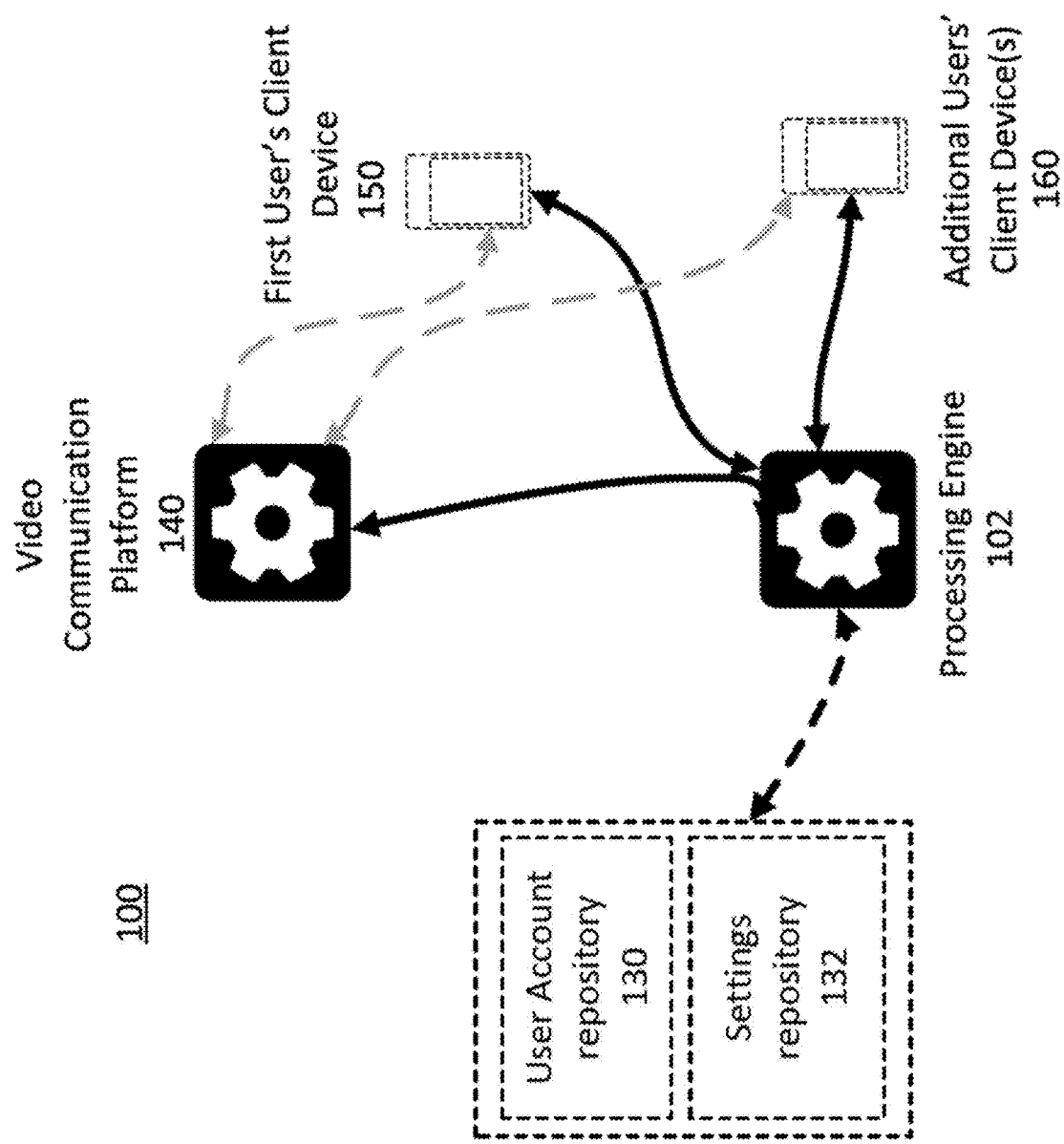
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 900, 1000, or other methods herein and, as a result, provide for authentication of video communications in a virtual environment. A virtual environment may comprise a VR environment or AR environment. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 900, 1000, or other methods herein and, as a result, provide for authentication of video communications in a virtual environment. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
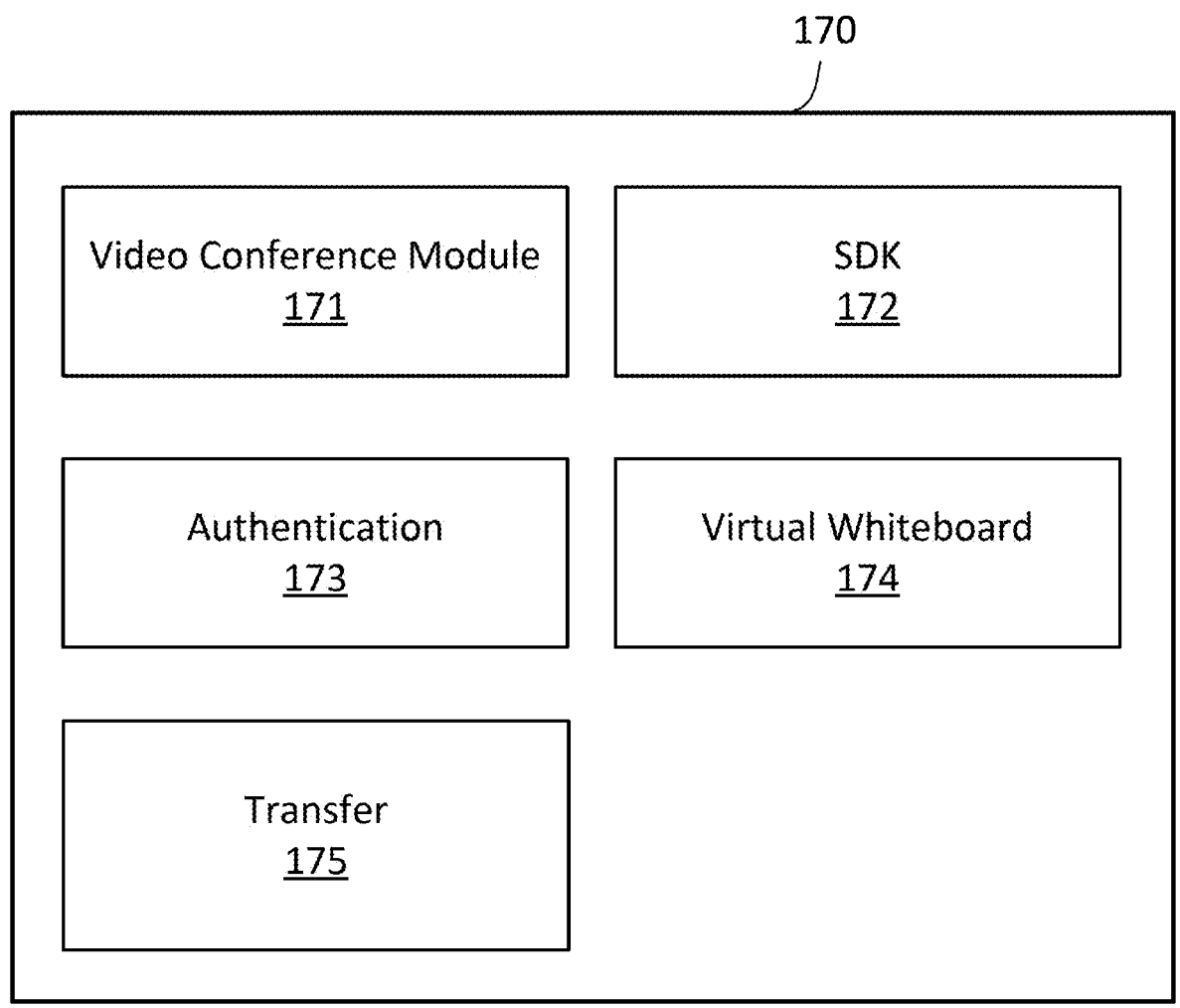
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device or a combination of server and client devices for extracting a user representation from a video stream to a virtual environment.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screen-share or a virtual environment as described herein. In an embodiment, synchronized audio may be provided with the video streams.

Software development kit (SDK) 172 provides system functionality for enabling an application to interface with the video conference module 171. In some embodiments, SDK 172 may comprise an application programming interface (API). SDK 172 may be distributed to enable software developers to use functionality of the video conference module 171 in first party or $3^{rd}$ party software applications. In some embodiments, SDK 172 may enable first party or $3^{rd}$ party software applications to provide video communication such as video conferencing via the video communication platform 140 and processing engine 102. In some embodiments, SDK 172 may enable VR or AR applications to integrate video communication into a virtual environment.

Authentication module 173 provides system functionality for authenticating a user to the video conference module 171. In an embodiment, authenticating to the video conference module 171 may allow the user to access protected resources such as one or more user accounts, video conference sessions, and so on. In an embodiment, the video conference module 171 may prompt the user to enter a username and/or password to login. In an embodiment, the video conference module 171 may verify the username and/or password compared to stored password information and provide credentials, such as an authentication token, to access video conference module 171. Other methods of authentication may be used such as two-factor authentication, passwordless authentication, biometric authentication, and so on. In an embodiment, a first device may transmit a request for credentials to a second device that has already authenticated with the video conference module 171. In an embodiment, the first device may receive credentials from the second device to enable the first device to access the video conference module 171.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Transfer module 175 provides system functionality for transferring a user session on a video conference application on a first device to a second device. In an embodiment, an option may be provided to a user of a video conference application to move a user session to a second device, such as a VR or AR device. In an embodiment, the user session may be transferred from the video conference application on the first device to the second device. In an embodiment, credentials may be transferred from the video conference application to the second device to enable the second device to continue the user session. In an embodiment, an identifier of a video conference session that is open on the video conference application may be transferred from the video conference application to the second device to enable the second device to join the video conference session.

Figure 2:
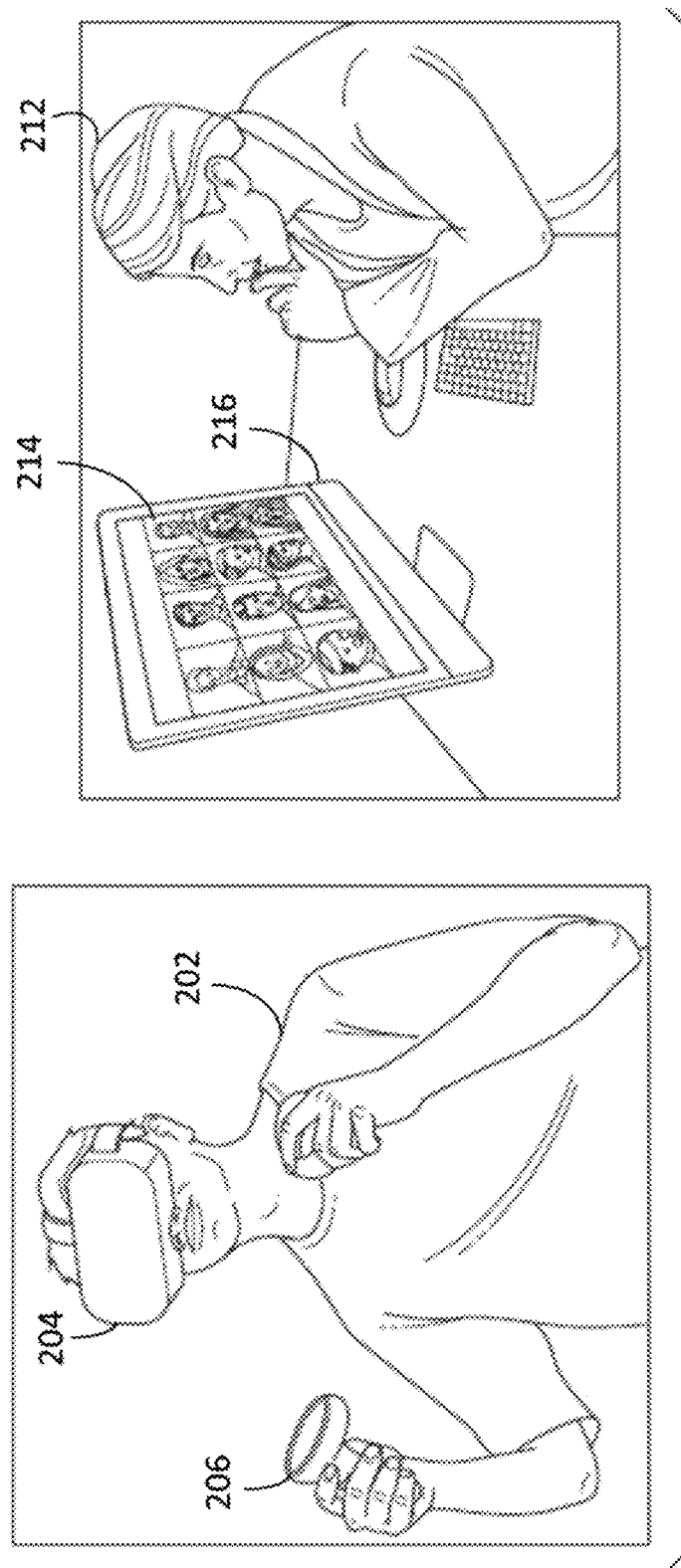
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
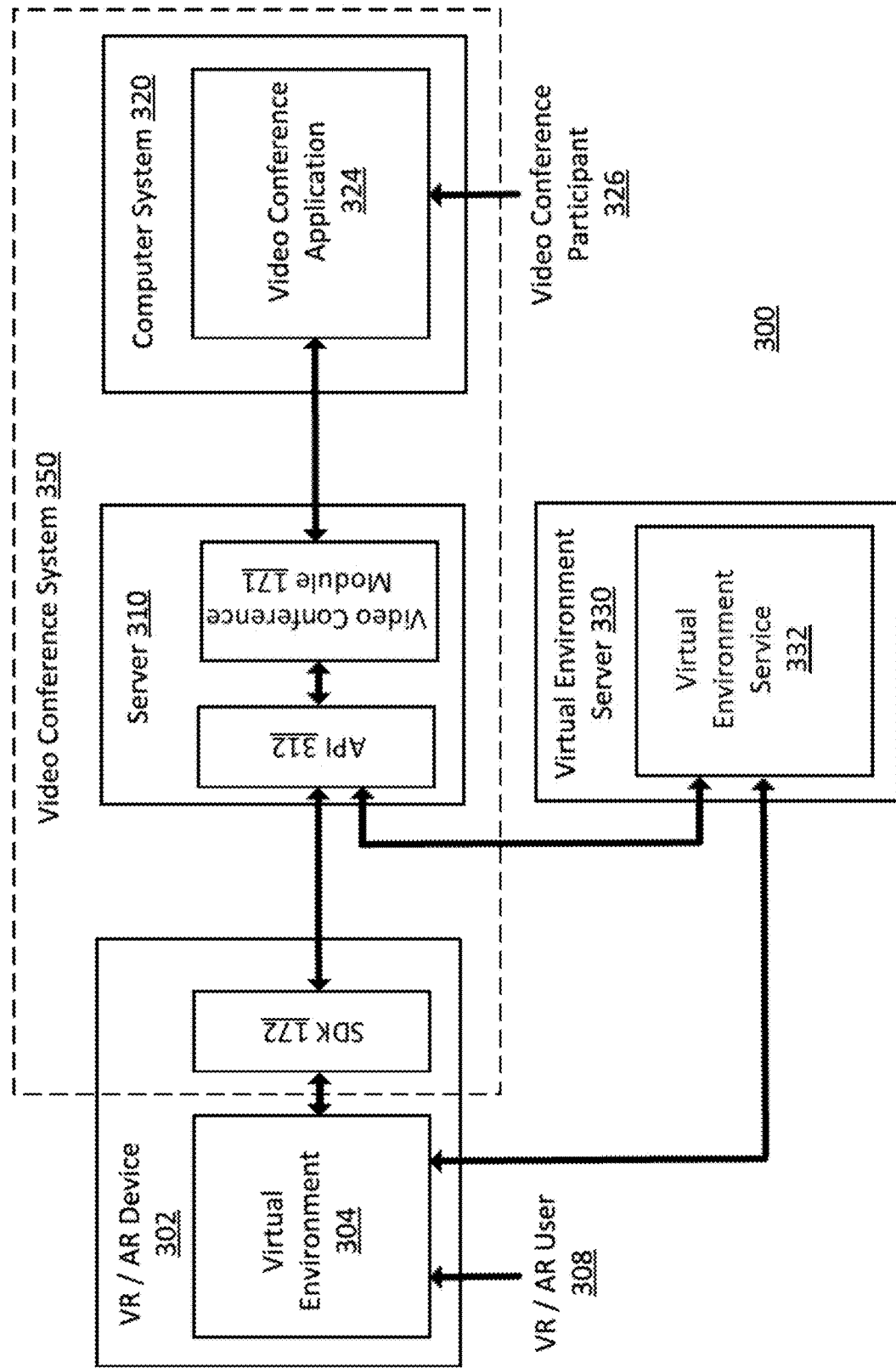
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communication.

In an embodiment, a VR/AR device 302, which may comprise a VR or AR device such as a headset, displays a virtual environment 304, which may comprise a VR environment or AR environment. VR/AR user 308, which may comprise a VR or AR user, may interact with the virtual environment 304 using the VR/AR device 302. Virtual environment 304 may connect with SDK 172 on VR/AR device 302. SDK 172 enables the virtual environment 304, which may comprise a VR or AR application, to connect to API 312 on server 310. The API 312 may provide access to functionality of video conferencing module 171. Virtual environment 304 may be enabled to provide access to video conference sessions that may include other VR/AR users and video conference participant 326 through SDK 172, API 312, and video conference module 171.

In an embodiment, virtual environment 304 may connect to virtual environment service 332 on virtual environment server 330. In an embodiment, the virtual environment service 332 may host a backend of the virtual environment 304. The virtual environment service 332 may comprise data and functions for providing the virtual environment 304 to the VR/AR user 308. For example, virtual environment service 332 may store persistent objects and locations in the virtual environment 304 and maintain a consistent virtual world for experience by other VR/AR users who may also join the same virtual environment through their own VR/AR device. In an embodiment, the virtual environment service 332 may optionally connect to the API 312 to communicate data to and from the video conference module 171. For example, the virtual environment service 332 may transmit or receive global data about the virtual environment 304 with the video conference module 171. In an embodiment, the virtual environment server 330 may include a copy of SDK 172 for interfacing between virtual environment service 332 and API 312.

In an embodiment, the computer system 320, video conference application 324, server 310, video conference module 171, API 312, and SDK 172 may comprise aspects of a video conference system 350. In an embodiment, the virtual environment 304, virtual environment server 330, and virtual environment service 332 may comprise aspects of a $3^{rd}$ party VR or AR application. Alternatively, the virtual environment 304, virtual environment server 330, and virtual environment service 332 may comprise aspects of a first party VR/AR application that comprise further aspects of video conference system 350.

II. Exemplary Systems

Figure 4:
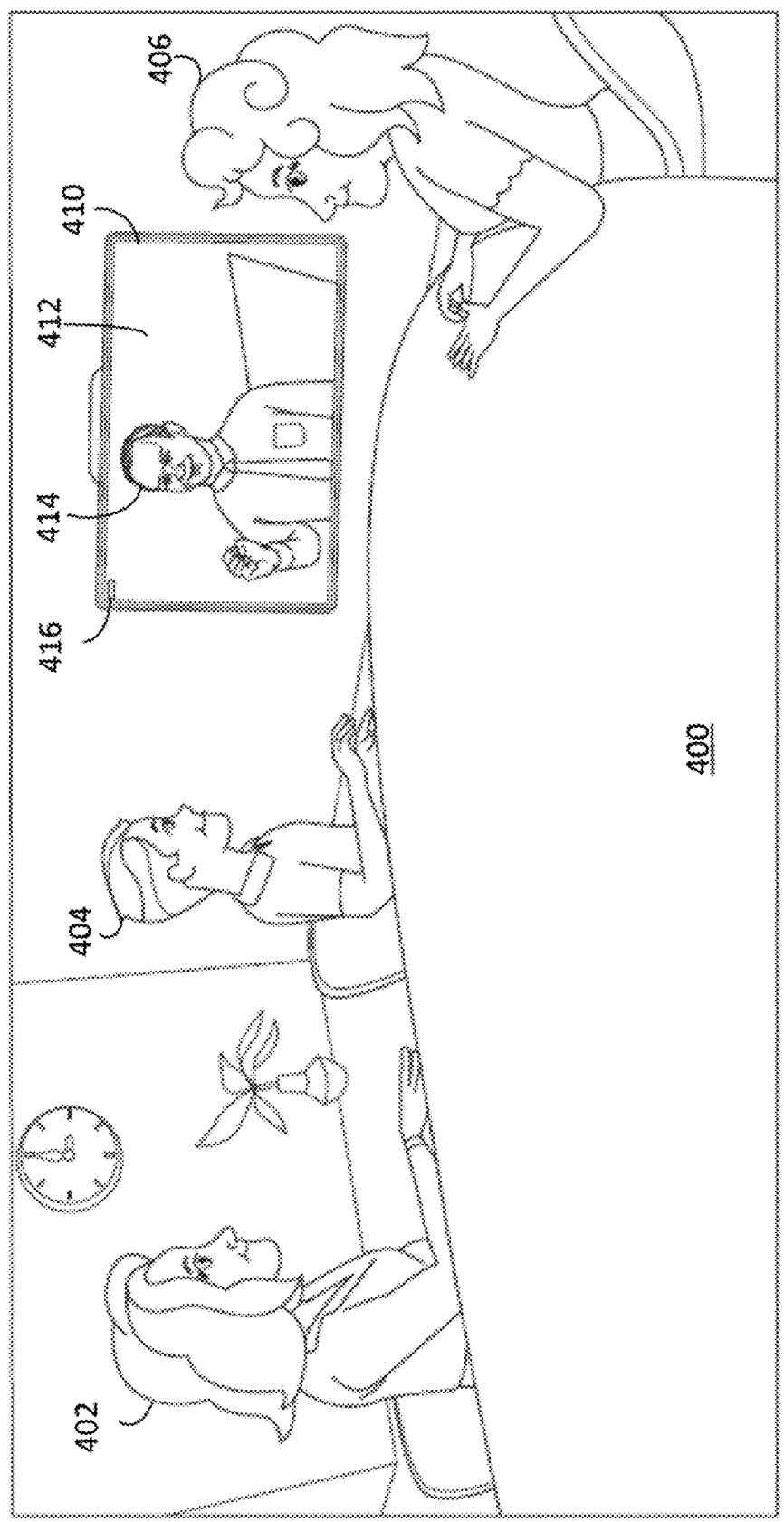
FIG. 4 illustrates an exemplary virtual environment according to one embodiment of the present disclosure.

FIG. 4 illustrates an exemplary virtual environment 400 according to one embodiment of the present disclosure. The virtual environment 400 may comprise a VR or AR environment such as a 3D world including digital representations, such as 3D avatars 402, 404, 406, of one or more users. Digital representations may also comprise 2D representations, such as images, videos, sprites, and so on. Each of the digital representations may represent a VR/AR user who is viewing and interacting with the virtual environment 400 from a VR/AR device. The virtual environment 400 may be displayed to each VR/AR user from the perspective of their digital representations. The virtual environment 400 is illustrated as an indoor conference room, but any other virtual environment may also be presented such as representations of outdoor areas, video game worlds, and so on.

Video conference view 410 in virtual environment 400 may display a video stream 412 including real-time video of video conference participant 414. The video may be captured from the camera of the computer system of the video conference participant 414. The VR or AR application may receive video stream 412 from video conference module 171 through SDK 172 and render the video stream 412 on the surface of a 3D object in the virtual environment 400, such as a 3D representation of a screen, projector, wall, or other object. In an embodiment, the video conferencing application may run in the virtual environment 400. VR or AR application may render a user interface 416 of the video conferencing application that may contain the video stream 412. The user interface 416 may also be rendered on the surface of a 3D object.

Figure 5:
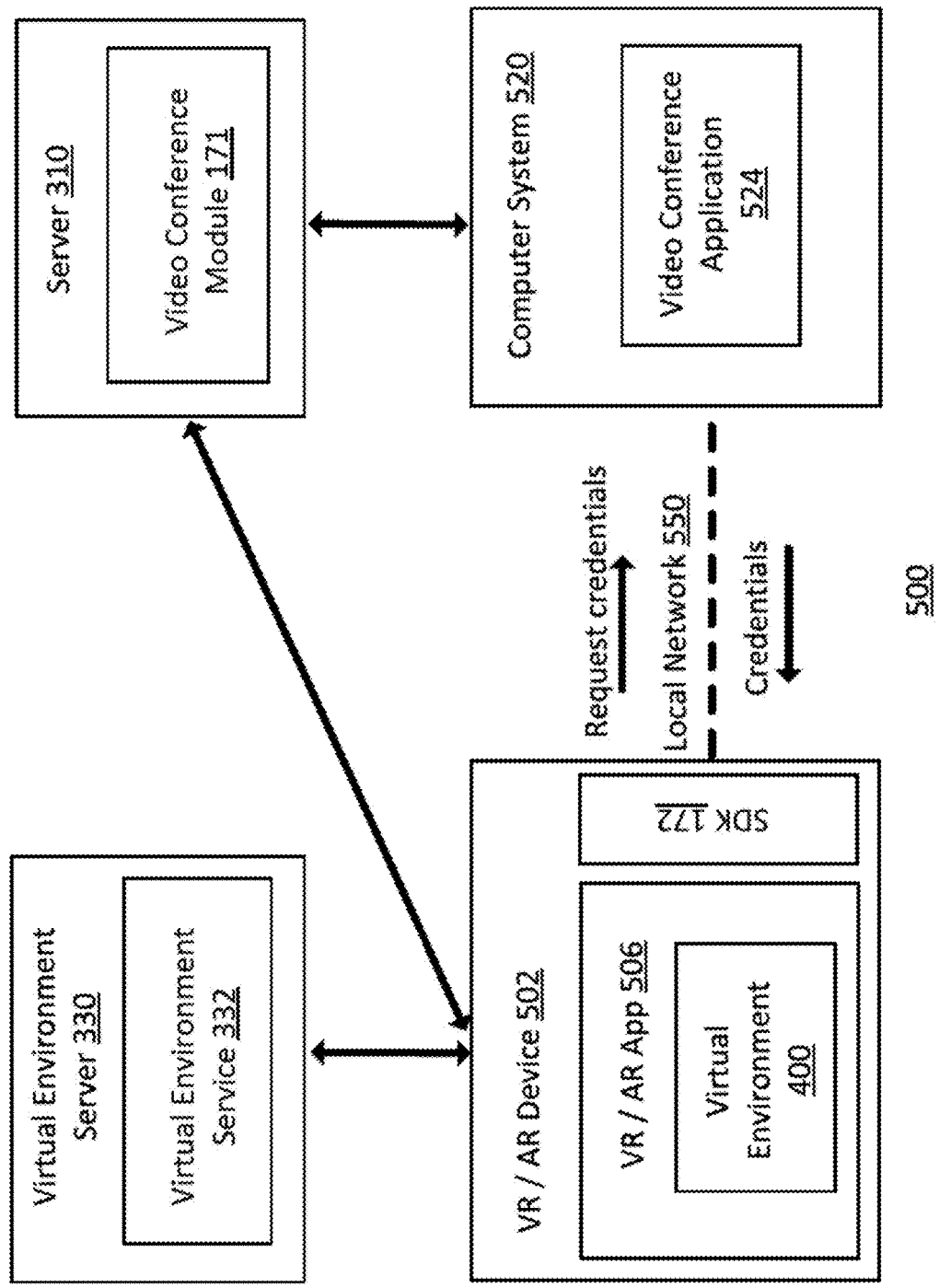
FIG. 5 illustrates an exemplary environment in which some embodiments may operate.

FIG. 5 illustrates an exemplary environment 500 in which some embodiments may operate. In an embodiment, a VR/AR device 502 and computer system 520 may be connected over a local network 550. The local network 550 may comprise a wired or wireless network, such as Wi-Fi, Bluetooth, Universal Serial Bus (USB), local area network (LAN), a cellular network, or other networks. In an embodiment, both the VR/AR device 502 and computer system 520 may access video conference sessions hosted by the server 310. In an embodiment, the computer system 520 comprises a video conference application 524. The video conference application 524 may connect to video conference module 171 on server 310 to join video conference sessions.

In an embodiment, VR/AR device 502 may comprise VR/AR application 506, which may further comprise virtual environment 400. The VR/AR application 506 may render the virtual environment 400. In an embodiment, the virtual environment 400 may include a video conference session, such as via video conference view 410. In an embodiment, the virtual environment 400 may connect to virtual environment service 332 on virtual environment server 330 to provide the virtual environment 400 and video conference module 171 on server 310 to provide the video conference session. In an embodiment, SDK 172 may enable the VR/AR application 506 to communicate with the video conference module 171 and with video conference application 524. For example, SDK 172 may comprise one or more computer procedures for transmitting data to and receiving data from the video conference module 171 and/or video conference application 524.

In an embodiment, VR/AR application 506 may use local system credentials for accessing the local network 550 and/or computer system 520 to remotely access the computer system 520. In an embodiment, VR/AR application 506 may use network credentials, such as a password, token, or other credentials, to access the local network 550. In an embodiment, VR/AR application 506 may use computer system credentials, such as a password, token, or other credentials, to access the computer system 520.

In an embodiment, VR/AR device 502 may connect to virtual environment server 330 and server 310 via the local network 550 or via a separate network connection. Similarly, computer system 520 may connect to the server 310 via the local network 550 or via a separate network connection. For example, local network 550 may connect to the Internet or other networks via a router.

In an embodiment, VR/AR device 502 may be enabled to join a video conference session in virtual environment 400 using credentials obtained from computer system 520. In an embodiment, VR/AR device 502 obtains credentials from computer system 520 through a process using SDK 172. Obtaining credentials from computer system 520 may allow a video conference participant to join a video conference session on VR/AR device 502 without having to re-login when the participant has already authenticated on the computer system 520. In an embodiment, VR/AR application 506 may request to join a virtual environment 400 that includes an associated video conference session. In some embodiments, the virtual environment 400 may have an identifier such as a hyperlink, uniform resource locator (URL), name, or the like that may be selectable to join the virtual environment 400. In an embodiment, VR/AR application 506 may transmit the request to join the virtual environment 400 to virtual environment service 332. Virtual environment service 332 may retrieve the virtual environment 400 and determine that the virtual environment includes a video conference session. Virtual environment service 332 may transmit a message to VR/AR application 506 to request that VR/AR application 506 authenticate to and join the video conference session.

In an embodiment, the VR/AR application 506 may verify whether the user has authenticated with the video conference module 171. In an embodiment, the VR/AR application 506 may transmit a request to join the video conference session to video conference module 171. In an embodiment, the VR/AR application 506 may communicate with the video conference module 171 using the SDK 172. The video conference module 171 may verify whether the user has authenticated. When the user has not been authenticated, the video conference module 171 may transmit a request to the VR/AR application 506 for the user to authenticate or join as a guest. VR/AR application 506 may display the option to authenticate or join as a guest to the user. In an embodiment, when the option of joining as a guest is selected, then the video conference module 171 may add the user to the video conference session as a guest and display a message to the other video conference participants that a guest user has joined the video conference session. In an embodiment, the user may join the virtual environment 400 including the video conference session as a guest participant. In some embodiments, fewer interactions may be enabled for guest participants than for video conference participants who have been authenticated. In an embodiment, the video conference session may display one or more identifiers showing the authenticated participants and guest participants.

In an embodiment, when the option of authenticating is selected, the VR/AR application 506 may display an option to the user to authenticate using an authenticated computer on the network. When the option to authenticate using an authenticated computer is selected, the VR/AR application 506 may check for computer systems on the local network 550. In some embodiments, the VR/AR application 506 may broadcast a message to computer systems on the local network 550 indicating a request for video conference application credentials. Computer systems that receive the request and have video conference application 524 installed may transmit the request to the video conference application 524. The video conference application 524 may transmit a response, including a computer system identifier, to VR/AR application 506 indicating that the computer systems are available to provide credentials. In an embodiment, the VR/AR application 506 may receive the responses and parse identifiers of the computer systems on the local network 550. In an embodiment, the VR/AR application 506 may communicate with video conference applications 524 on the local network using SDK 172. In an embodiment, the VR/AR application may display available computer systems on the local network 550 to the user for selection. The VR/AR application 506 may prompt the user to select a computer system to access. The VR/AR application 506 may optionally display a confirmation request for the user to confirm using credentials from the remote computer system. The VR/AR application 506 may optionally wait for user confirmation to continue. When a user selection and optional confirmation are received, the VR/AR application 506 may transmit a request to the selected computer system for credentials for the video conference module 171.

In an embodiment, the selected computer system, such as computer system 520, may receive the request and transmit the request to video conference application 524. In an embodiment, the video conference application 524 may check for valid credentials in the data storage of the application. When valid credentials are found, the video conference application 524 may transmit the credentials over the local network 550 to the VR/AR application 506. Optionally, the video conference application 524 may display a prompt to the user of whether to allow VR/AR application 506 to use credentials from the video conference application 524. For example, the video conference application 524 may display a window, pop up, text, or graphics requesting permission to share the credentials. When a selection is received to share credentials, then the video conference application 524 may transmit the credentials to VR/AR application 506. In an embodiment, the video conference application 524 may include a configuration setting to share credentials with other devices, which enables the video conference application 524 to transmit credentials to VR/AR application 506 without displaying a prompt to the user.

When valid credentials are not found, the video conference application 524 may prompt the user to enter login information, such as username and/or password or other login information, on computer system 520 to login. In an embodiment, the computer system 520 may enable the user to login to the video conference module 171 using keyboard, mouse, touchpad, and/or other user interface controls. In response to entry of the login information, the login information may be transmitted from the computer system 520 to the video conference module 171. The video conference module 171 may authenticate the user based on the login information and transmit credentials to the video conference application 524. The video conference application 524 may transmit the credentials over the local network 550 to the VR/AR application 506. Alternatively, when valid credentials are not found, the video conference application 524 may transmit a message to VR/AR application 506 that credentials are not available so that the VR/AR application 506 may display an alert to the user that login from the connected computer is not available.

In an embodiment, the VR/AR application 506 may receive the credentials from video conference application 524, and VR/AR application 506 may transmit the credentials to video conference module 171. The video conference module 171 may verify the credentials to authenticate the user. In an embodiment, after authentication, the video conference module 171 may enable the user to join the video conference session. In an embodiment, the video conference module 171 may transmit an authentication acknowledgement message to the VR/AR application 506. In an embodiment, the VR/AR application 506 confirms that the user has authenticated to the video conference session by parsing and verifying the authentication acknowledgement message. In an embodiment, the video conference module 171 may transmit a connection to the video conference session to the VR/AR application 506.

In an embodiment, the VR/AR application 506 may load and display the virtual environment 400 to the user. In an embodiment, the VR/AR application 506 may transmit a request to virtual environment service 332 to load the virtual environment 400. The VR/AR application 506 may receive virtual environment data from the virtual environment service 332 for loading the virtual environment 400. The VR/AR application 506 may load the virtual environment 400 based on the virtual environment data. In an embodiment, the VR/AR application 506 may provide access to the video conference session in the virtual environment 400. In an embodiment, the VR/AR application 506 may display one or more video streams from the video conference session in the virtual environment 400 and play audio from the video conference session.

In an embodiment, video conference credentials transmitted from the video conference application 524 to the VR/AR application 506 may comprise password information, a digital certificate, cryptographic information, an authentication token, or other credentials. In an embodiment, an authentication token may comprise encrypted information verifying the identity of the user. For example, the authentication token may associate the user to a user account on video communication platform and/or processing engine 102. In an embodiment, the authentication token may be valid for a limited time period and expire when the time period has been exceeded. In an embodiment, a new authentication token may be used for each user session. In an embodiment, the authentication token may be valid during the time the video conference application is running and may expire when the video conference application is closed and the user session ends. In an embodiment, credentials may comprise a Javascript Object Notation (JSON) Web Token (JWT). In an embodiment, the authentication token may optionally comprise a plurality of components, such as a header, payload, and/or signature. In an embodiment, the header may comprise metadata, the payload may comprise token data, and the signature may comprise a secure signature to deter tampering. In an embodiment, the authentication token may optionally be signed using public key cryptography.

In an embodiment, credentials may be obtained in the video conference application 524 after entry of login information, such as username and/or password. Alternative login methods may be used such as two-factor authentication, passwordless authentication, biometric authentication, and so on. The login information may be transmitted to video conference module 171 and verified by video conference module 171 to authenticate the user. In an embodiment, the video conference module 171 may verify login information by comparing it to stored login data. For example, video conference module 171 may verify a password by comparing it to password data, such as a password hash. In response to authentication of the user, the video conference module 171 may transmit credentials to the video conference application 524. The video conference application 524 may retain the credentials for a specified time period during which the credentials are valid. When the video conference application 524 receives a request for credentials, while the credentials are valid, the video conference application 524 may transmit the credentials to VR/AR application 506.

Figure 6:
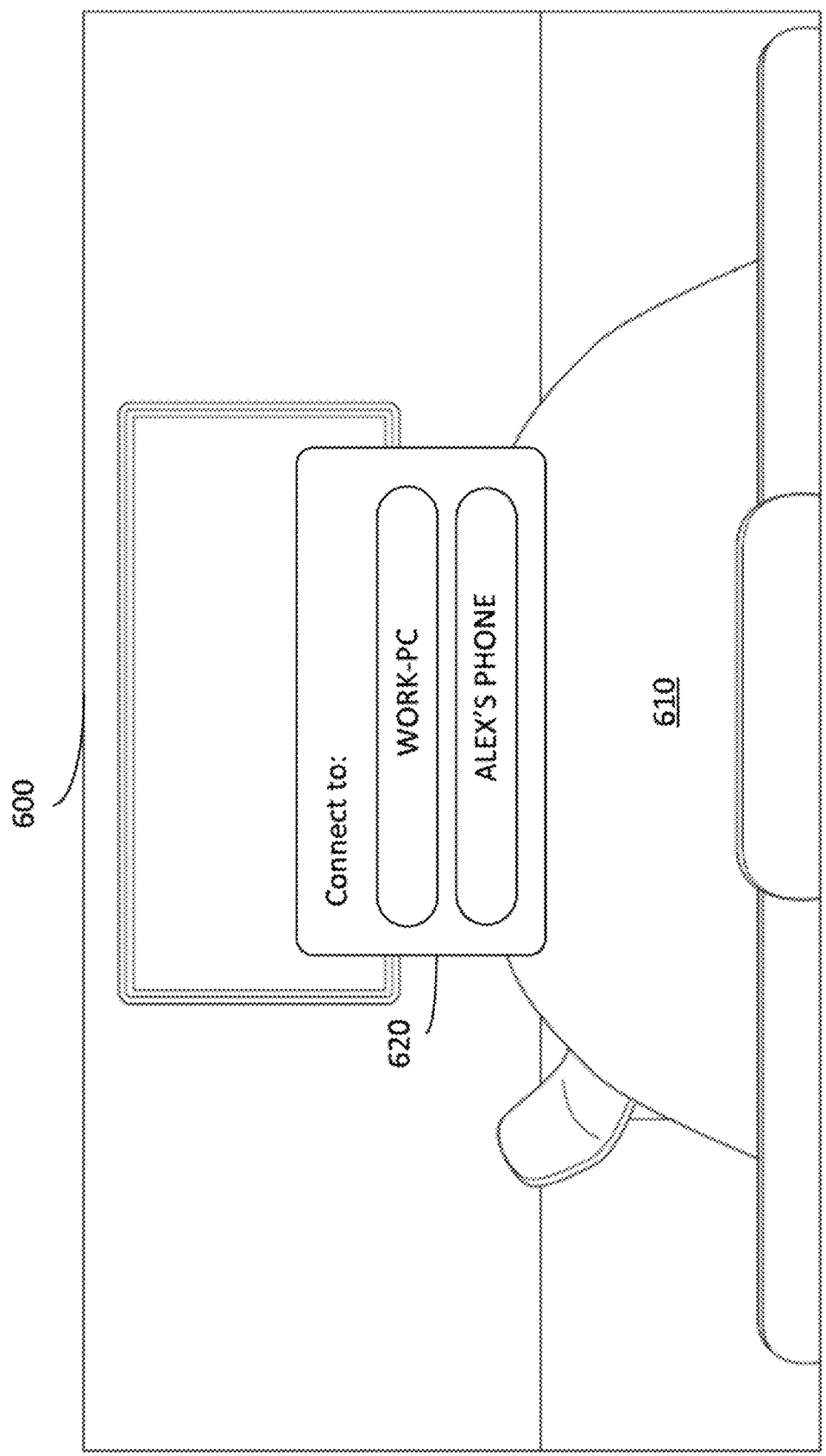
FIG. 6 illustrates an exemplary user interface according to one embodiment of the present disclosure.

FIG. 6 illustrates an exemplary user interface 600 according to one embodiment of the present disclosure. In an embodiment, VR/AR application 506 may display user interface 600 to enable connecting to a computer system 520 to request video conference application credentials. In an embodiment, VR/AR application 506 may display a 3D waiting area or waiting screen 610 to the user while waiting for the user to authenticate. In an embodiment, VR/AR application 506 may display an option to obtain credentials from a computer on the local network 550. In an embodiment, VR/AR application 506 may display a prompt 620 to the user to receive a user selection of one or more computer systems on the local network 550 to connect to for credentials. In an embodiment, prompt 620 may comprise a menu, drop-down menu, list, selector, buttons, or other user interface elements. In response to a selection, VR/AR application 506 may connect to the selected computer system and transmit a request to the selected computer system for credentials to access a video conference session.

Figure 7:
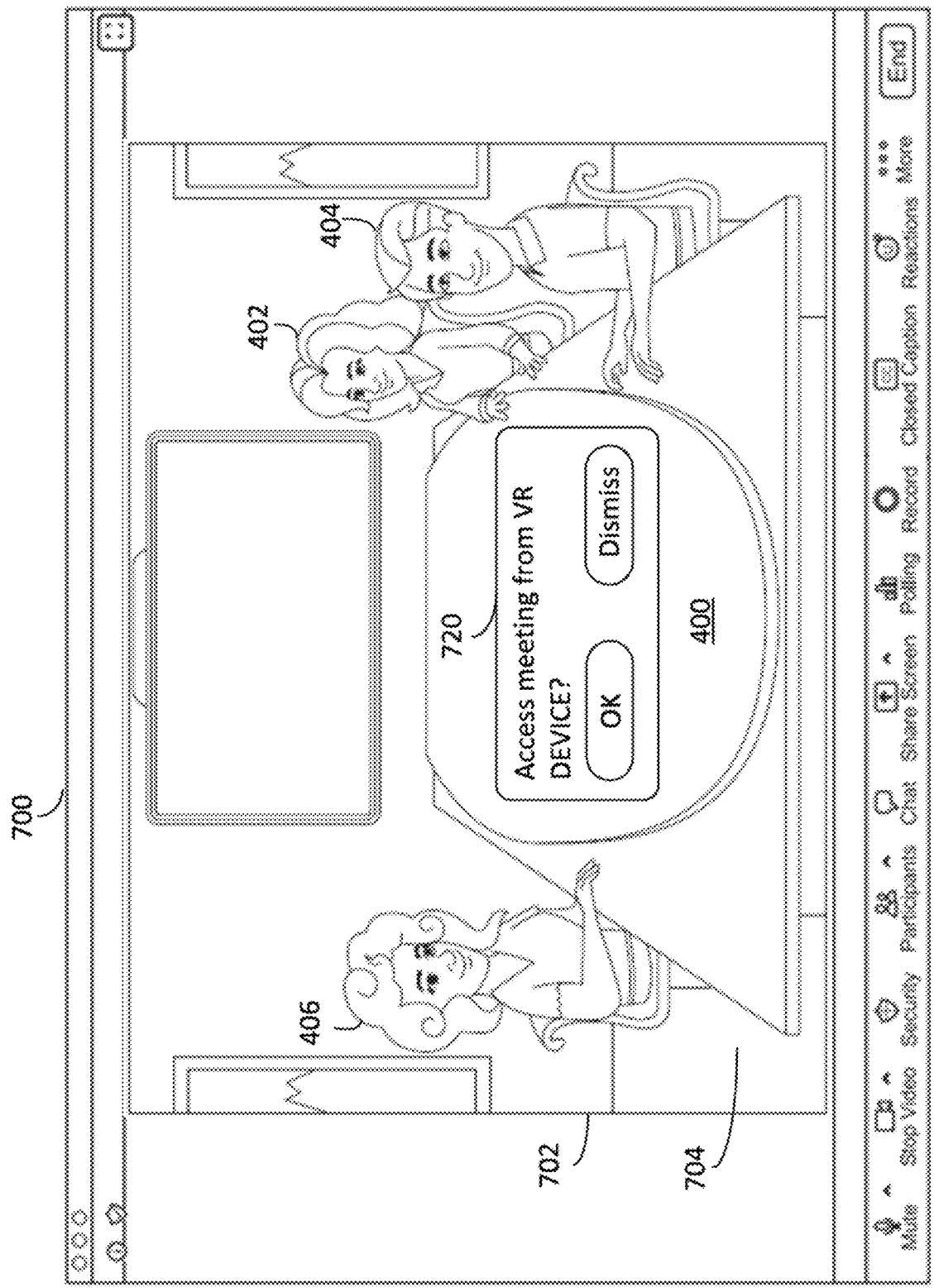
FIG. 7 illustrates an exemplary user interface according to one embodiment of the present disclosure.

FIG. 7 illustrates an exemplary user interface 700 according to one embodiment of the present disclosure. User interface 700 may comprise the interface of a video conference application. Content view 702 displays a view of the virtual environment 400, including the 3D avatars 402, 404, 406 of participants in the video conference. Virtual environment 400 may include a virtual whiteboard. The content view 702 may comprise video content 704, such as streaming video, captured from a virtual camera in the virtual environment 400. The video content may be encoded in streaming video format by an encoder on a VR/AR device 302 or a server 310. In some embodiments, the encoder may comprise SDK 172. In an embodiment, the video content may comprise 2D video formats such as MP4, MP3, AVI, FLV, WMV, and other formats. The video content may be transmitted from the VR/AR device 302 to the video conference module 171 of the server 310 and on to the computer system 320 and video conference application 324. User interface 700 may be displayed on a computer system to a video conference participant 326. In an embodiment, user interface 700 may be displayed on the surface of a 3D object to display the video conferencing application in a virtual environment 400, such as user interface 416. In an embodiment, user interface 700 may include one or more user interface controls for controlling the video conference, sharing the screen, recording, and so on.

In an embodiment, user interface 700 may include an option for transferring the user session from the computer system 320 to a different device. In an embodiment, user interface 700 may display a prompt 720 to the user to enable transferring the user session from the computer system 320 to a different device. In an embodiment, the prompt 720 may display one or more devices that may be selected. In an embodiment, prompt 720 may comprise a menu, drop-down menu, list, selector, buttons, or other user interface elements. In response to selection of a device, transfer module 175 may transfer the user session from the computer system 320 to a different device. In an embodiment, the different device may comprise a VR/AR device.

Figure 8:
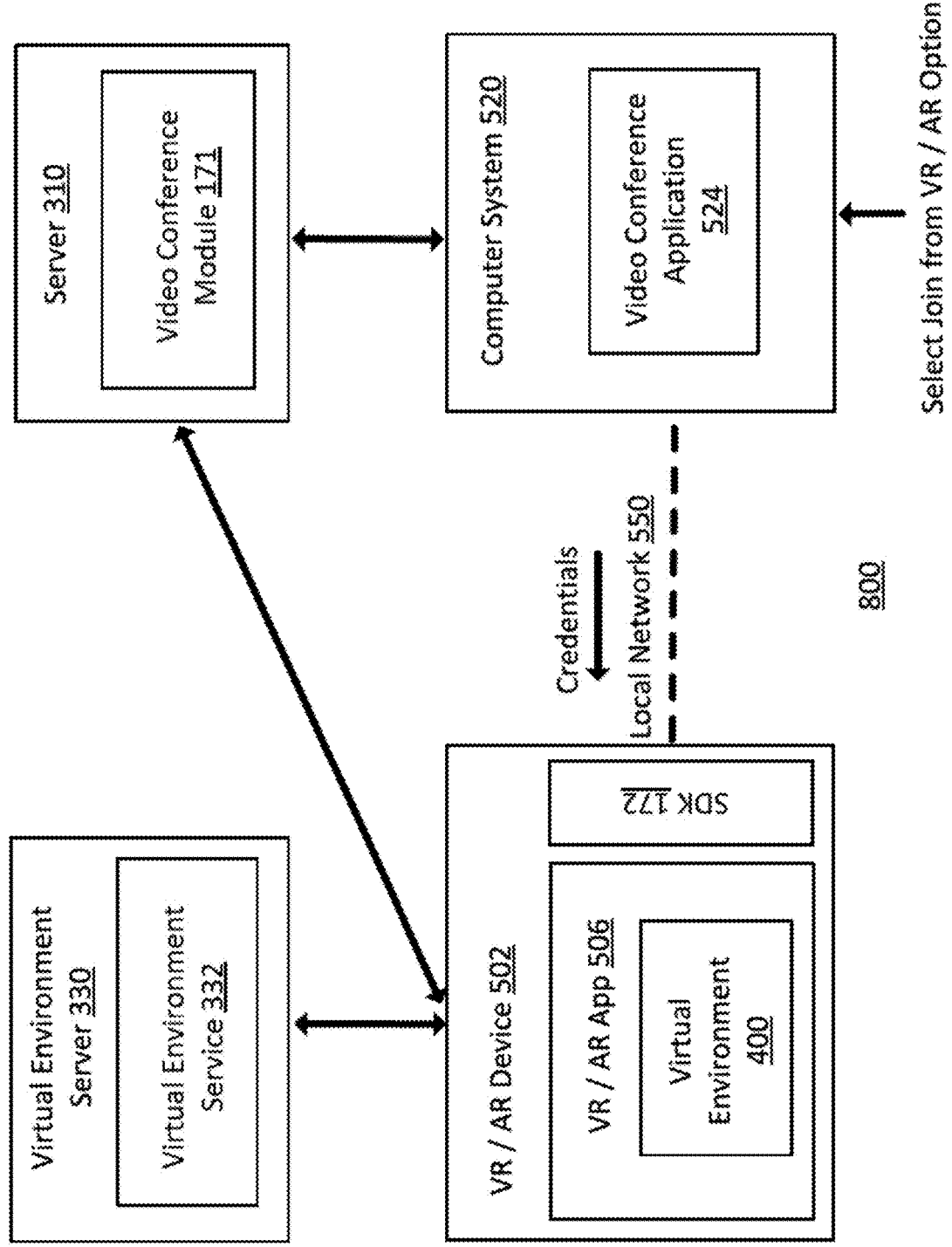
FIG. 8 illustrates an exemplary environment in which some embodiments may operate.

FIG. 8 illustrates an exemplary environment 800 in which some embodiments may operate. As described elsewhere herein, a VR/AR device 502 and computer system 520 may be connected over a local network 550 in an environment 800 including a server 310 comprising video conference module 171 and virtual environment server 330 comprising virtual environment service 332. VR/AR device 502 and computer system 520 may connect to the video conference module 171 to access one or more video conference sessions. In an embodiment, SDK 172 may enable the VR/AR application 506 to communicate with the video conference module 171 and with video conference application 524. In an embodiment, the environment 800 may include the same functionality as environment 500.

In an embodiment, video conference application 524 may enable logging in to a video conference system via video conference module 171. In an embodiment, video conference application 524 may transmit login information, such as username and/or password, two-factor authentication, passwordless authentication, biometric authentication, or so on, to video conference module 171. Video conference module 171 may verify the login information to authenticate and log in the user. In response to logging in, video conference module 171 may transmit credentials to video conference application 524. The credentials may be stored in the video conference application 524.

Optionally, a request to join a video conference session may be received from the user. In an embodiment, video conference application 524 may transmit a request to join the video conference session to video conference module 171, and the video conference module 171 may respond by transmitting a connection to the video conference session to video conference application 524. In an embodiment, the video conference session may be displayed to the user in user interface 700. The video conference session may optionally include a virtual environment 400 including one or more 3D avatars 402, 404, 406.

In an embodiment, video conference application 524 may receive a request from the user to transfer the user session to a different device. In an embodiment, video conference application 524 may broadcast a message to devices on the local network 550 indicating a request to transfer the user session of the video conference application. Devices on the local network 550 may receive and process the message and each of the devices able to transfer the user session may transmit a response, including an identifier of the device, indicating that the device is available. In an embodiment, the video conference application 524 may receive the responses and parse identifiers of the devices on the local network 550. In an embodiment, video conference application 524 may display a prompt 720 to enable selecting a device to which to transfer the session. In an embodiment, the prompt 720 may include one or more user interface controls to confirm the transfer of the user session. In an embodiment, the video conference application 524 may receive a selection of a device, such as VR/AR device 502, and confirm transferring the user session.

In an embodiment, the video conference application 524 may transmit the credentials to the selected device. In an embodiment, the selected device, VR/AR device 502, receives the credentials and transmits the credentials to the VR/AR application 506. In an embodiment, the video conference application 524 may transmit user session information to the VR/AR application 506 to enable recovering the user session at the same point. If a video conference session is currently active in the video conference application 524, the video conference application 524 may transmit an identifier of the active video conference session to the VR/AR application 506. For example, the identifier may comprise a hyperlink, URL, name, or other identifier suitable for accessing the video conference session.

In an embodiment, VR/AR application 506 may receive credentials, user session information, and/or an identifier of an active video conference session using SDK 172. In an embodiment, VR/AR application 506 may receive the credentials from video conference application 524 and may login to video conference module 171 using the credentials. In an embodiment, VR/AR application 506 may transmit the credentials to video conference module 171. The video conference module 171 may verify the credentials to authenticate the user. In an embodiment, the video conference module 171 may transmit an authentication acknowledgement message to the VR/AR application 506. In an embodiment, the VR/AR application 506 confirms that the user has authenticated to the video conference module 171 by parsing and verifying the authentication acknowledgement message. In an embodiment, the VR/AR application 506 may access user session information from the video conference application 524 to restore the user session that was in progress on the video conference application 524.

In an embodiment, VR/AR application 506 may load and display the virtual environment 400 to the user. In an embodiment, the VR/AR application 506 may access virtual environment service 332 to load the virtual environment 400. In an embodiment, the VR/AR application 506 may transmit a request to virtual environment service 332 to load the virtual environment 400. The VR/AR application 506 may receive virtual environment data from the virtual environment service 332 for loading the virtual environment 400. The VR/AR application 506 may load the virtual environment 400 based on the virtual environment data.

If an identifier of a video conference session was received from the video conference application 524, then the VR/AR application 506 may use the identifier to access the video conference session on video conference module 171 and load the video conference session in the virtual environment 400. In an embodiment, the VR/AR application 506 may transmit a request, including the identifier, to join the video conference session to the video conference module 171. In an embodiment, the request may also include the video conference application credentials. The VR/AR application 506 may receive a connection to the video conference session from the video conference module 171. In an embodiment, the VR/AR application 506 may display one or more video streams from the video conference session in the virtual environment 400 and play audio from the video conference session. In an embodiment, VR/AR application 506 may transmit an acknowledgement over the local network 550 to video conference application 524 that the video conference session was transferred. In response to receiving the acknowledgement, the video conference application 524 may optionally leave the video conference session such as by closing the connection, so that the user has one active session in the video conference on VR/AR device 502, and/or close the video conference application 524.

III. Exemplary Methods

Figure 9:
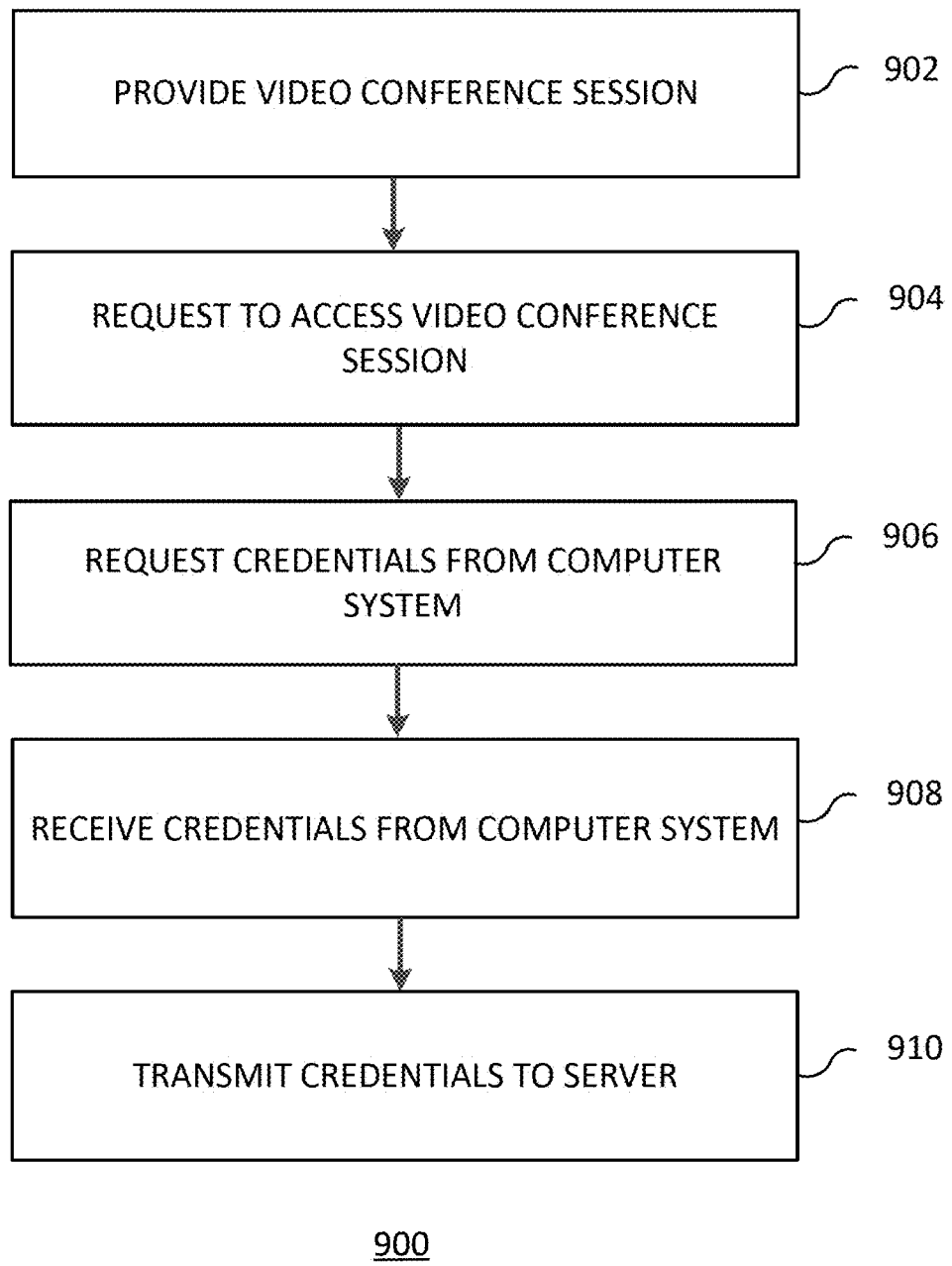
FIG. 9 illustrates an exemplary method that may be performed in some embodiments.

FIG. 9 illustrates an exemplary method 900 that may be performed in some embodiments.

At step 902, a video conference session may be provided in a virtual environment. In an embodiment, the video conference session is hosted on a video conference server and may connect a plurality of video conference participants. In an embodiment, the video conference session may connect one or more VR/AR users in the virtual environment and one or more video conference participants joining from one or more computer systems.

At step 904, a request is transmitted, by a VR or AR device, to access the video conference session in the virtual environment. In an embodiment, the VR or AR device may transmit the request to a video conference server. In an embodiment, the request may include an identifier such as a hyperlink, URL, name, or other identifier of the video conference session. In an embodiment, the video conference server may identify the user based on the contents of the request and determine whether the user is authenticated. When the user is not authenticated, the video conference server may transmit a request to the VR or AR device for credentials to authenticate the user. The VR or AR device may receive the request for credentials.

At step 906, a request may be transmitted, by the VR or AR device, to a computer system for credentials to access the video conference session. In an embodiment, the VR or AR device may transmit the request over a local network. In an embodiment, a video conference application on the computer system may check for valid credentials for accessing the video conference session and may transmit the credentials over the local network to the VR or AR device.

At step 908, the credentials may be received from the computer system. In an embodiment, the VR or AR device may receive the credentials from the computer system over the local network. In an embodiment, the credentials may comprise a digital certificate, cryptographic information, an authentication token, or other credentials.

At step 910, the credentials may be transmitted to a video conference server to access the video conference session in the virtual environment. In an embodiment, the VR or AR device transmits the credentials to the video conference server. In an embodiment, the video conference server may authenticate the credentials by comparing the credentials to stored credential information. In an embodiment, VR or AR device may display the video conference session in the virtual environment, including one or more video streams of video conference participants.

Figure 10:
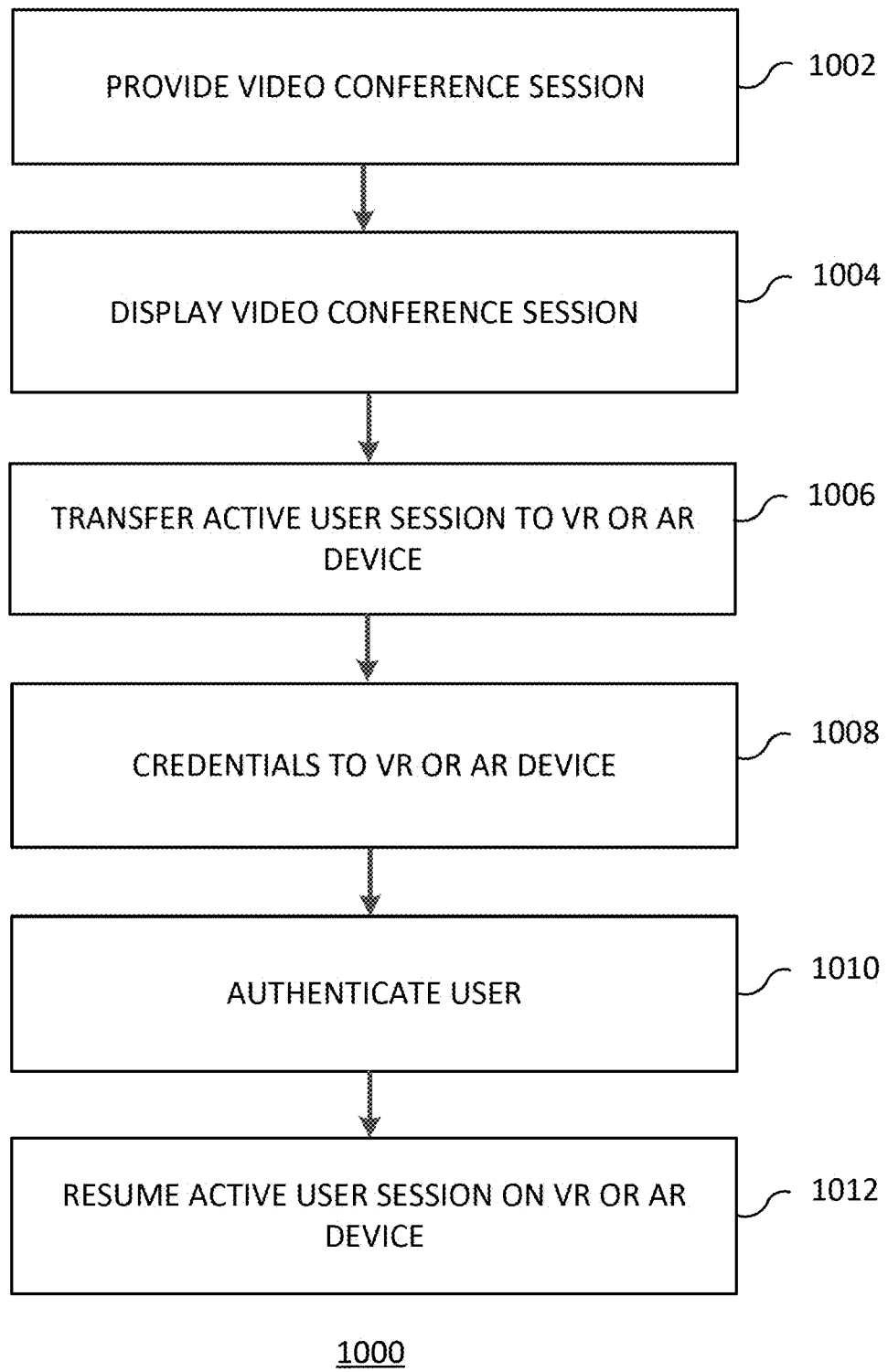
FIG. 10 illustrates an exemplary method that may be performed in some embodiments.

FIG. 10 illustrates an exemplary method 1000 that may be performed in some embodiments.

At step 1002, a video conference session may be provided in a virtual environment. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1004, the video conference session may be displayed in a video conference application. In an embodiment, a video stream of the virtual environment may be displayed in the video conference application.

At step 1006, an active user session of the video conference application is transferred to a VR or AR device. In an embodiment, the video conference application may display an option to transfer the active user session to a different device. In an embodiment, the video conference application may receive a request to transfer the active user session and a selection of a device to which to transfer the user session. In an embodiment, user session information may be transferred from the video conference application to the VR or AR device.

At step 1008, credentials and user session information may be transmitted to the VR or AR device. In an embodiment, the video conference application may transmit the credentials and user session information to the VR or AR device over the local network. In an embodiment, the credentials may comprise a digital certificate, cryptographic information, an authentication token, or other credentials.

At step 1010, the credentials may be transmitted to a video conference server to authenticate a user. In an embodiment, the VR or AR device transmits the credentials to the video conference server. In an embodiment, the video conference server may authenticate the credentials by comparing the credentials to stored credential information.

At step 1012, the active user session may be resumed on the VR or AR device based on the user session information. In an embodiment, the VR or AR device may display the video conference session in the virtual environment, including one or more video streams of video conference participants.

Exemplary Computer System

Figure 11:
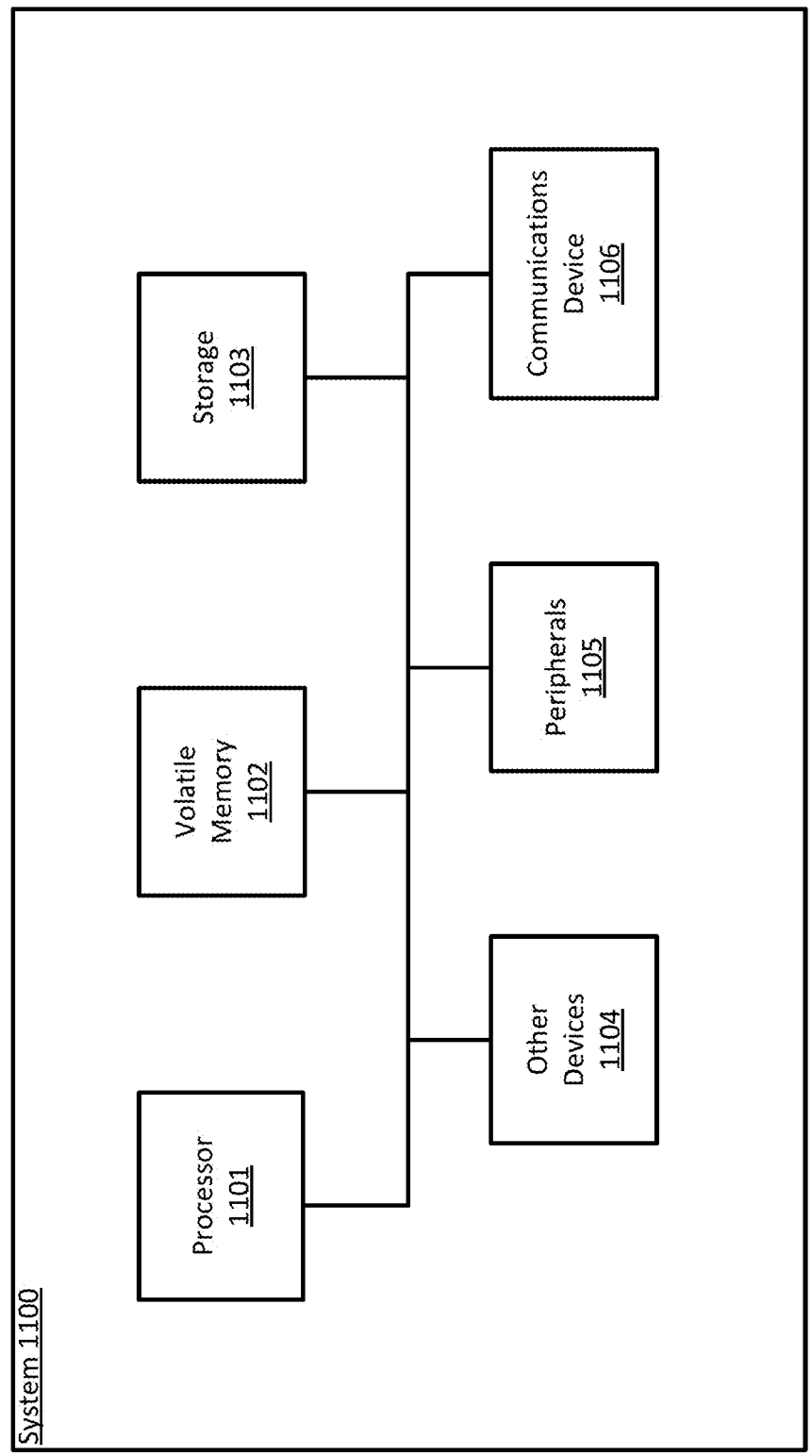
FIG. 11 is a diagram illustrating an exemplary computer that may perform processing in some embodiments.

FIG. 11 is a diagram illustrating an exemplary computer that may perform processing in some embodiments. Exemplary computer 1100 may perform operations consistent with some embodiments. The architecture of computer 1100 is exemplary. Computers can be implemented in a variety of other ways. A wide variety of computers can be used in accordance with the embodiments herein.

Processor 1101 may perform computing functions such as running computer programs. The volatile memory 1102 may provide temporary storage of data for the processor 1101. RAM is one kind of volatile memory. Volatile memory typically requires power to maintain its stored information. Storage 1103 provides computer storage for data, instructions, and/or arbitrary information. Non-volatile memory, which can preserve data even when not powered and including disks and flash memory, is an example of storage. Storage 1103 may be organized as a file system, database, or in other ways. Data, instructions, and information may be loaded from storage 1103 into volatile memory 1102 for processing by the processor 1101.

The computer 1100 may include peripherals 1105. Peripherals 1105 may include input peripherals such as a keyboard, mouse, trackball, video camera, microphone, and other input devices. Peripherals 1105 may also include output devices such as a display. Peripherals 1105 may include removable media devices such as CD-R and DVD-R recorders/players.

Communications device 1106 may connect the computer 1100 to an external medium. For example, communications device 1106 may take the form of a network adapter that provides communications to a network. A computer 1100 may also include a variety of other devices 1104. The various components of the computer 1100 may be connected by a connection medium such as a bus, crossbar, or network.

It will be appreciated that the present disclosure may include any one and up to all of the following examples.

Example 1: A method comprising: providing a video conference session in a virtual environment; transmitting, by a virtual reality (VR) or augmented reality (AR) device, a request to access the video conference session in the virtual environment; transmitting, by the VR or AR device, a request to a computer system for credentials to access the video conference session; receiving from the computer system the credentials; transmitting the credentials to a video conference server to access the video conference session in the virtual environment.

Example 2: The method of Example 1, wherein the virtual environment comprises a VR environment including 3D avatars of one or more users.

Example 3: The method of any of Examples 1-2, wherein the virtual environment comprises an AR environment comprising one or more AR holograms.

Example 4: The method of any of Examples 1-3, wherein the credentials comprise an authentication token.

Example 5: The method of any of Examples 1-4, wherein the credentials comprise a JWT.

Example 6: The method of any of Examples 1-5, further comprising: providing a video stream of the virtual environment in the video conference session.

Example 7: The method of any of Examples 1-6, further comprising: displaying, by a video conference application on the computer system, a login form; receiving login information in the login form; transmitting the login information to the video conference server; receiving the credentials from the video conference server in response to the login information.

Example 8: The method of any of Examples 1-7, further comprising: in response to receiving the request for credentials to access the video conference session, displaying a login form by a video conference application on the computer system; authenticating, by the video conference application, the user to the video conference server; receiving credentials from the video conference server and transmitting the credentials to the VR or AR device.

Example 9: The method of any of Examples 1-8, further comprising: providing an avatar of a user of the VR or AR device in the virtual environment.

Example 10: The method of any of Examples 1-9, wherein the credentials are signed using public key cryptography.

Example 11: The method of any of Examples 1-10, wherein the VR or AR device connects to the computer system over a local network.

Example 12: The method of any of Examples 1-11, wherein the VR or AR device communicates with the computer system via an SDK.

Example 13: The method of any of Examples 1-12, wherein the VR or AR device communicates with the video conference server via an SDK.

Example 14: The method of any of Examples 1-13, wherein the request to the computer system for credentials is transmitted via an API.

Example 15: A non-transitory computer readable medium that stores executable program instructions that when executed by one or more computing devices configure the one or more computing devices to perform operations comprising: providing a video conference session in a virtual environment; transmitting, by a VR or AR device, a request to access the video conference session in the virtual environment; transmitting, by the VR or AR device, a request to a computer system for credentials to access the video conference session; receiving from the computer system the credentials; transmitting the credentials to a video conference server to access the video conference session in the virtual environment.

Example 16: The non-transitory computer readable medium of Example 15, wherein the virtual environment comprises a VR environment including 3D avatars of one or more users.

Example 17: The non-transitory computer readable medium of any of Examples 15-16, wherein the virtual environment comprises an AR environment comprising one or more AR holograms.

Example 18: The non-transitory computer readable medium of any of Examples 15-17, wherein the credentials comprise an authentication token.

Example 19: The non-transitory computer readable medium of any of Examples 15-18, wherein the credentials comprise a JWT.

Example 20: The non-transitory computer readable medium of any of Examples 15-19, wherein the executable program instructions further configure the one or more computing devices to perform operations comprising: providing a video stream of the virtual environment in the video conference session.

Example 21: The non-transitory computer readable medium of any of Examples 15-20, wherein the executable program instructions further configure the one or more computing devices to perform operations comprising: displaying, by a video conference application on the computer system, a login form; receiving login information in the login form; transmitting the login information to the video conference server; receiving the credentials from the video conference server in response to the login information.

Example 22: The non-transitory computer readable medium of any of Examples 15-21, wherein the executable program instructions further configure the one or more computing devices to perform operations comprising: in response to receiving the request for credentials to access the video conference session, displaying a login form by a video conference application on the computer system; authenticating, by the video conference application, the user to the video conference server; receiving credentials from the video conference server and transmitting the credentials to the VR or AR device.

Example 23: The non-transitory computer readable medium of any of Examples 15-22, wherein the executable program instructions further configure the one or more computing devices to perform operations comprising: providing an avatar of a user of the VR or AR device in the virtual environment.

Example 24: The non-transitory computer readable medium of any of Examples 15-23, wherein the credentials are signed using public key cryptography.

Example 25: The non-transitory computer readable medium of any of Examples 15-24, wherein the VR or AR device connects to the computer system over a local network.

Example 26: The non-transitory computer readable medium of any of Examples 15-25, wherein the VR or AR device communicates with the computer system via an SDK.

Example 27: The non-transitory computer readable medium of any of Examples 15-26, wherein the VR or AR device communicates with the video conference server via an SDK.

Example 28: The non-transitory computer readable medium of any of Examples 15-27, wherein the request to the computer system for credentials is transmitted via an API.

Example 29: A system comprising one or more processors configured to perform the operations of: providing a video conference session in a virtual environment; transmitting, by a VR or AR device, a request to access the video conference session in the virtual environment; transmitting, by the VR or AR device, a request to a computer system for credentials to access the video conference session; receiving from the computer system the credentials; transmitting the credentials to a video conference server to access the video conference session in the virtual environment.

Example 30: The system of Example 29, wherein the virtual environment comprises a VR environment including 3D avatars of one or more users.

Example 31: The system of any of Examples 29-30, wherein the virtual environment comprises an AR environment comprising one or more AR holograms.

Example 32: The system of any of Examples 29-31, wherein the credentials comprise an authentication token.

Example 33: The system of any of Examples 29-32, wherein the credentials comprise a JWT.

Example 34: The system of any of Examples 29-33, wherein the processors are further configured to perform the operations of: providing a video stream of the virtual environment in the video conference session.

Example 35: The system of any of Examples 29-34, wherein the processors are further configured to perform the operations of: displaying, by a video conference application on the computer system, a login form; receiving login information in the login form; transmitting the login information to the video conference server; receiving the credentials from the video conference server in response to the login information.

Example 36: The system of any of Examples 29-35, wherein the processors are further configured to perform the operations of: in response to receiving the request for credentials to access the video conference session, displaying a login form by a video conference application on the computer system; authenticating, by the video conference application, the user to the video conference server; receiving credentials from the video conference server and transmitting the credentials to the VR or AR device.

Example 37: The system of any of Examples 29-36, wherein the processors are further configured to perform the operations of: providing an avatar of a user of the VR or AR device in the virtual environment.

Example 38: The system of any of Examples 29-37, wherein the credentials are signed using public key cryptography.

Example 39: The system of any of Examples 29-38, wherein the VR or AR device connects to the computer system over a local network.

Example 40: The system of any of Examples 29-39, wherein the VR or AR device communicates with the computer system via an SDK.

Example 41: The system of any of Examples 29-40, wherein the VR or AR device communicates with the video conference server via an SDK.

Example 42: The system of any of Examples 29-41, wherein the request to the computer system for credentials is transmitted via an API.

Example 43: A method comprising: providing a video conference session in a virtual environment; displaying the video conference session in a video conference application; transferring an active user session of the video conference application to a VR or AR device; transmitting credentials and user session information to the VR or AR device; transmitting the credentials to a video conference server to authenticate a user; resuming the active user session on the VR or AR device based on the user session information.

Example 44: The method of Example 43, wherein the credentials comprise an authentication token.

Example 45: The method of any of Examples 43-44, further comprising: providing a video stream of the video conference session in the virtual environment.

Example 46: The method of any of Examples 43-45, further comprising: transmitting, by the video conference application, an identifier of the video conference session to the VR or AR device.

Example 47: The method of any of Examples 43-46, wherein the VR or AR device communicates with the video conference application via an SDK.

Example 48: The method of any of Examples 43-47, wherein transferring the active user session of the video conference application to the VR or AR device is performed using an API.

Example 49: A non-transitory computer readable medium that stores executable program instructions that when executed by one or more computing devices configure the one or more computing devices to perform operations comprising: providing a video conference session in a virtual environment; displaying the video conference session in a video conference application; transferring an active user session of the video conference application to a VR or AR device; transmitting credentials and user session information to the VR or AR device; transmitting the credentials to a video conference server to authenticate a user; resuming the active user session on the VR or AR device based on the user session information.

Example 50: The non-transitory computer readable medium of Example 49, wherein the credentials comprise an authentication token.

Example 51: The non-transitory computer readable medium of any of Examples 49-50, wherein the executable program instructions further configure the one or more computing devices to perform operations comprising: providing a video stream of the video conference session in the virtual environment.

Example 52: The non-transitory computer readable medium of any of Examples 49-51, wherein the executable program instructions further configure the one or more computing devices to perform operations comprising: transmitting, by the video conference application, an identifier of the video conference session to the VR or AR device.

Example 53: The non-transitory computer readable medium of any of Examples 49-52, wherein the VR or AR device communicates with the video conference application via an SDK.

Example 54: The non-transitory computer readable medium of any of Examples 49-53, wherein transferring the active user session of the video conference application to the VR or AR device is performed using an API.

Example 55: A system comprising one or more processors configured to perform the operations of: providing a video conference session in a virtual environment; displaying the video conference session in a video conference application; transferring an active user session of the video conference application to a VR or AR device; transmitting credentials and user session information to the VR or AR device; transmitting the credentials to a video conference server to authenticate a user; resuming the active user session on the VR or AR device based on the user session information.

Example 56: The system of Example 55, wherein the credentials comprise an authentication token.

Example 57: The system of any of Examples 55-56, wherein the processors are further configured to perform the operations of: providing a video stream of the video conference session in the virtual environment.

Example 58: The system of any of Examples 55-57, wherein the processors are further configured to perform the operations of: transmitting, by the video conference application, an identifier of the video conference session to the VR or AR device.

Example 59: The system of any of Examples 55-58, wherein the VR or AR device communicates with the video conference application via an SDK.

Example 60: The system of any of Examples 55-59, wherein transferring the active user session of the video conference application to the VR or AR device is performed using an API.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   transmitting, by a virtual reality (VR) or augmented reality (AR) device, a first request to a video conference server of a video communication platform to access a video conference session in a virtual environment of the video communication platform, wherein the video conference server is configured to simultaneously facilitate two-dimensional (2D) video conference sessions and interface with a virtual environment server to provide a three-dimensional (3D) virtual environment to VR devices or AR devices;

transmitting, by the VR or AR device and via a local network, a second request to a computer system for credentials to access the video conference session, wherein the computer system comprises a video conference application configured according to the credentials, and wherein the computer system is a local client device that has accessed video conference sessions of the video communication platform using the credentials;

receiving, from the computer system, the credentials; and transmitting the credentials to the video conference server to access the video conference session in the 3D virtual environment.

2. The method of claim 1, wherein the first request includes an identifier of the video conference session.

3. The method of claim 1, wherein the virtual environment comprises an AR environment comprising one or more AR holograms.

4. The method of claim 1, wherein the credentials comprise an authentication token.

5. The method of claim 1, wherein the credentials comprise a Javascript Object Notation Web Token (JWT).

6. The method of claim 1, further comprising:
providing a video stream of the virtual environment in the video conference session.

7. The method of claim 1, further comprising:
displaying, at the VR or AR device, a login form to connect to the computer system;
receiving login information in the login form; and
connecting to the computer system using the login information, wherein the credentials are received from the computer system in response to the login information.

8. The method of claim 1, wherein the computer system comprises a single client computing device running the video conference application.

9. A non-transitory computer readable medium that stores executable program instructions that when executed by one or more computing devices configure the one or more computing devices to perform operations comprising:
transmitting, by a virtual reality (VR) or augmented reality (AR) device, a first request to a video conference server of a video communication platform to access a video conference session in a virtual environment of the video communication platform, wherein the video conference server is configured to simultaneously facilitate two-dimensional (2D) video conference sessions and interface with a virtual environment server to provide a three-dimensional (3D) virtual environment to VR devices or AR devices;
transmitting, by the VR or AR device and via a local network, a second request to a computer system for credentials to access the video conference session, wherein the computer system comprises a video conference application configured according to the credentials, and wherein the computer system is a local client device that has accessed video conference sessions of the video communication platform using the credentials;
receiving, from the computer system, the credentials; and
transmitting the credentials to the video conference server to access the video conference session in the 3D virtual environment.

10. The non-transitory computer readable medium of claim 9, wherein the first request includes an identifier of the video conference session.

11. The non-transitory computer readable medium of claim 9, wherein the virtual environment comprises an AR environment comprising one or more AR holograms.

12. The non-transitory computer readable medium of claim 9, wherein the credentials comprise an authentication token.

13. The non-transitory computer readable medium of claim 9, wherein the credentials comprise a Javascript Object Notation Web Token (JWT).

14. The non-transitory computer readable medium of claim 9, wherein the executable program instructions further configure the one or more computing devices to perform operations comprising:
providing a video stream of the virtual environment in the video conference session.

15. The non-transitory computer readable medium of claim 9, wherein the executable program instructions further configure the one or more computing devices to perform operations comprising:
displaying, at the VR or AR device, a login form to connect to the computer system;
receiving login information in the login form; and
connecting to the computer system using the login information, wherein the credentials are received from the computer system in response to the login information.

16. A system comprising:
one or more processors configured to:
transmit, by a virtual reality (VR) or augmented reality (AR) device, a first request to a video conference server of a video communication platform to access a video conference session in a virtual environment of the video communication platform, wherein the video conference server is configured to simultaneously facilitate two-dimensional (2D) video conference sessions and interface with a virtual environment server to provide a three-dimensional (3D) virtual environment to VR devices or AR devices;
transmit, by the VR or AR device and via a local network, a second request to a computer system for credentials to access the video conference session, wherein the computer system comprises a video conference application configured according to the credentials, and wherein the computer system is a local client device that has accessed video conference sessions of the video communication platform using the credentials;
receive, from the computer system, the credentials; and
transmit the credentials to the video conference server to access the video conference session in the 3D virtual environment.

17. The system of claim 16, wherein the first request includes an identifier of the video conference session.

18. The system of claim 16, wherein the credentials comprise an authentication token.

19. The system of claim 16, wherein the one or more processors are further configured to:
provide a video stream of the virtual environment in the video conference session.

20. The system of claim 16, wherein the VR or AR device communicates with the computer system via an SDK.

21. The system of claim 16, wherein the request to the computer system for credentials is transmitted via an API.

* * * * *